(12) United States Patent
Ying et al.

(10) Patent No.: US 8,642,006 B2
(45) Date of Patent: Feb. 4, 2014

(54) MESOCELLULAR FOAM PARTICLES

(75) Inventors: Jackie Y. Ying, Singapore (SG); Su Seong Lee, Singapore (SG); Yu Han, Singapore (SG); Sukandar Hidinoto, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 944 days.

(21) Appl. No.: 11/922,294

(22) PCT Filed: Jun. 16, 2005

(86) PCT No.: PCT/SG2005/000194
§ 371 (c)(1),
(2), (4) Date: Nov. 10, 2009

(87) PCT Pub. No.: WO2006/135339
PCT Pub. Date: Dec. 21, 2006

(65) Prior Publication Data
US 2010/0048390 A1   Feb. 25, 2010

(51) Int. Cl.
*B01D 15/08* (2006.01)
*B01J 20/10* (2006.01)
*B29C 67/06* (2006.01)
*B01J 21/04* (2006.01)
*B01J 21/06* (2006.01)
*B01J 23/22* (2006.01)
*B01J 35/04* (2006.01)

(52) U.S. Cl.
USPC .......... 423/659; 210/198.2; 210/656; 264/42; 422/211; 428/402; 502/232; 502/240; 502/242; 502/247; 502/263; 502/527.24

(58) Field of Classification Search
USPC ................. 502/242, 232, 247, 263; 210/656, 210/198.1; 428/402; 264/42; 423/659; 422/139
See application file for complete search history.

(56) References Cited

U.S. PATENT DOCUMENTS 2,892,797 A   6/1959  Alexander et al.
5,045,190 A * 9/1991  Carbonell et al. ......... 210/198.2
(Continued)

FOREIGN PATENT DOCUMENTS

WO   WO 98/24724 A1   6/1998
WO   WO 00/10916 A1   3/2000
(Continued)

OTHER PUBLICATIONS

He, Liu et al., "Mesoporous TMOS-MTMS copolymer silica gels catalyzed by fluoride," *Journal of Non-Crystalline Solids*, vol. 289, pp. 97-105 (2001).

(Continued)

*Primary Examiner* — Wayne Langel
*Assistant Examiner* — Syed Iqbal
(74) *Attorney, Agent, or Firm* — Kilpatrick Townsend & Stockton LLP (57) ABSTRACT

The present invention provides a process for making regular shaped particles of solid foam. A first mixture, comprising water, an acid, a surfactant and a hydrophobic material, is combined with a hydrolysable silicon species to form a second mixture. The second mixture is maintained under conditions and for a sufficient time to form regular shaped precursor particles. The second mixture is then aged at a temperature and for a time effective to produce the regular shaped particles of solid foam.

27 Claims, 5 Drawing Sheets

(56) References Cited

U.S. PATENT DOCUMENTS

| | | | |
|---|---|---|---|
| 5,209,998 | A | 5/1993 | Kavassalis et al. |
| 5,922,299 | A | 7/1999 | Bruinsma et al. |
| 6,174,512 | B1 | 1/2001 | Kosuge et al. |
| 6,413,373 | B1 | 7/2002 | Matsuda et al. |
| 6,544,923 | B1 | 4/2003 | Ying et al. |
| 6,746,659 | B2 | 6/2004 | Pinnavaia et al. |
| 6,808,768 | B2 | 10/2004 | Satou |
| 2002/0197206 | A1 | 12/2002 | Balkus, Jr. et al. |
| 2004/0067842 | A1 | 4/2004 | Pinnavaia et al. |
| 2004/0229751 | A1 | 11/2004 | Pinnavaia et al. |
| 2009/0095041 | A1* | 4/2009 | Ramsey et al. .............. 71/58 |

FOREIGN PATENT DOCUMENTS

| | | |
|---|---|---|
| WO | WO 00/39028 A1 | 7/2000 |
| WO | WO 01/12564 A1 | 2/2001 |
| WO | WO 0112564 A1 * | 2/2001 |
| WO | WO 01/78925 A1 | 10/2001 |
| WO | WO 01/92154 A1 | 12/2001 |
| WO | WO 03/053849 A1 | 7/2003 |
| WO | WO 2004/050234 A1 | 6/2004 |
| WO | WO 2004/054708 A2 | 7/2004 |

OTHER PUBLICATIONS

Kim, Mi Jeong, et al., "Synthesis and Pore Size Control of Cubic Mesoporous Silica SBA-1," Chemistry of Materials, American Chemical Society, Chem. Mater., vol. 11, No. 2, pp. 487-491 (Feb. 1, 1999).

Kamiya, Satoshi, et al., "Electron microscopic study of structural evolutions of silica mesoporous crystals: crystal-growth and crystal-transformation from p6mm to Pm3@?n with time," Solid State Sciences, Elsevier, vol. 5, No. 1, (Jan. 1, 2003).

Blin, J.L. et al.; "Well-Ordered Spherical Mesoporous Materials CMI-1 Synthesized via an Assembly of Decaoxyethylene Cetyl Ether and TMOS"; 2001, Chem. Mater., vol. 13, pp. 3542-3553.

Boissiere, Cedric et al.; "Spherical MSU-1 Mesoporous Silica Particles Tunes for HPLC"; 2001, Adv. Funct. Mater., vol. 11, No. 2, pp. 129-135.

Buchel, Gunter et al.; "A Novel Pathway for Synthesis of Submicrometer-Size Solid Core/Mesoporous Shall Silica Spheres"; 1998, Adv. Mater., vol. 10, No. 13, pp. 1036-1038.

Ding, Julia et al.; "Synthesis and Surface Chemistry of Spherical Mesoporous Organic-Inorganic Hybrid Particles with an Integrated Alcohol Functionality on the Pore Surface"; 2004, Chem. Mater., vol. 16, pp. 670-681.

Gallis, Karl W. et al.; "The Use of Mesoporous Silica in Liquid Chromatography"; 1999, Adv. Mater., vol. 11, No. 17, pp. 1452-1455.

Han, Yu et al.; "Generalized Fluorocarbon-Surfactant-Mediated Synthesis of Nanoparticles with Various Mesoporous Structures"; 2005, Angew. Chem. Int. Ed., vol. 44, pp. 288-292.

Kosuge, Katsunori et al.; "Direct Synthesis of Porous Pure and Thiol-Functional Silica Spheres through the $S^+X^-I^+$ Assembly Pathway"; 2003, Chem. Mater., vol. 15, pp. 3184-3189.

Lettow, John S. et al.; "Hexagonal to Mesocellular Foam Phase Transition in Polymer-Templated Mesoporous Silicas"; 2000, Langmuir, vol. 16, pp. 8291-8295.

Matsumoto, Akihiko et al.; "Surface Functionalization and Stabilization of Mesoporous Silica Spheres by Silanization and Their Adsorption Characteristics"; 2002, Langmuir, vol. 18, pp. 4014-4019.

Mesa, Monica et al.; "Prepartion of micron-sized spherical particles of mesoporous silica from a triblock copolymer surfactant, usable as a stationary phase for liquid chromatography"; 2003, Solid State Sciences, vol. 5, pp. 1303-1308.

Schmidt-Winkel, Patrick et al.; "Mesocellular Siliceous Foams with Uniformly Sized Cells and Windows"; 1999, J. Am. Chem. Soc.; vol. 121, pp. 254-255.

Schmidt-Winkel, Patrick et al.; "Microemulsion Templating of Siliceous Mesostructured Cellular Foams with Well-Defined Ultralarge Mesopores"; 2000, Chem. Mater., vol. 12, pp. 686-696.

Thoelen, Carla et al.; "Spherical MCM-41 as support material in enantioselective HPLC"; 2000, Tetrahedron Asymmetry, vol. 11, pp. 4819-4823.

Qi, Limin et al.; "Micrometer-Sized Mesoporous Silica Spheres Grown under Static Conditions"; 1998, Chem. Mater., vol. 10, pp. 1623-1626.

Yang, Hong et al.; "Synthesis of mesoporous silica spheres under quiescent aqueous acidic conditions"; 1998, J. Mater. Chem., vol. 8, No. 3, pp. 743-750.

* cited by examiner

MESOCELLULAR FOAM PARTICLES

This application is a U.S. National Phase and claims the benefit of PCT Patent Application No. PCT/SG2005/000194, filed Jun. 16, 2005, the disclosure of which is incorporated herein by reference.

The present invention relates to mesocellular foam particles, processes for synthesizing them and applications for using them.

BACKGROUND OF THE INVENTION

Mesoporous silica materials with uniform pore sizes have attracted considerable attention for applications in catalysis and separations, and as hosts for clusters and nanowires. The particle morphology of mesoporous silica is very important for certain applications. For example, spherical morphology is preferred when porous silica is used as a stationary phase in chromatography or as a catalytic support. Much research has been devoted to the morphological control of mesoporous silica. Several mesoporous silica materials were recently prepared with spherical particle morphology, and used as packing materials for HPLC columns. However, their use in separations has not been satisfactory due to their small pore sizes ($\leq 4$ nm) and particle agglomeration.

There is therefore a need for a process for the synthesis of regular shaped, for example spherical, particles with an ultralarge pore size. The resulting particles could then be applied as HPLC column packing material, and could be used as catalytic supports for a packed bed reactor.

OBJECT OF THE INVENTION

It is an object of the present invention to overcome or substantially ameliorate at least one of the above disadvantages. It is a further object to at least partially satisfy the above need.

SUMMARY OF THE INVENTION

In a first aspect of the invention there is provided a process for making regular shaped particles of solid foam comprising:
- preparing a first mixture comprising water, an acid, a surfactant and a hydrophobic material;
- combining a hydrolysable silicon species with the first mixture to form a second mixture;
- maintaining the second mixture under conditions and for a sufficient time to form regular shaped precursor particles; and
- aging the second mixture at a temperature and for a time effective to produce the regular shaped particles of solid foam.

The first mixture may be a solution, or it may be an emulsion, a microemulsion or a dispersion. The regular shaped precursor particles may have a particle size between about 1 and about 20 microns or between about 2 and about 50 microns. The regular shaped precursor particles may be porous (for example microporous or mesoporous) or non-porous. They may comprise solid, gel, rubber, paste, liquid or a combination of any two or more of these. They may be deformable or not deformable. They may be about the same size as the particles of solid foam. The shape of the regular shaped precursor particles, and, independently, of the particles of solid foam, may be spherical, or may be some other shape. The precursor particles may comprise silica particles, aluminosilicate particles or some other silicon containing particles. The solid foam may comprise silica foam, aluminosilicate foam or some other silicon containing foam, and may comprise mesoporous silica or aluminosilicate foam.

The process may comprise the step of adding a pore size control agent. The pore size control agent may be added before, during or after the step of maintaining the second mixture to form the precursor particles.

The step of preparing the first mixture may comprise preparing an acidic solution of the surfactant, and combining the hydrophobic material with the acidic solution of the surfactant to form the first mixture. Alternatively it may comprise preparing a mixture of the surfactant and the hydrophobic material and then adding the acid, or it may comprise preparing a mixture of the acid and the hydrophobic material and then adding the surfactant.

After formation of the first mixture, it may be mixed, stirred, swirled, shaken, sonicated or otherwise agitated.

After the step of adding the hydrolysable silicon species to the first mixture to form the second mixture, the second mixture may be maintained at a particular temperature for a suitable time before aging. Before the maintaining, the second mixture may be briefly mixed, stirred, swirled, shaken, sonicated or otherwise agitated, for example for between about 1 and about 10 minutes. The conditions of the maintaining may be without agitation, or without externally applied agitation, or may be with sufficiently mild agitation as to allow formation of the regular shaped precursor particles. During said maintaining, the second mixture may be static, or may be not mixed, not stirred, not swirled, not shaken and not sonicated. The particular temperature and suitable time may be sufficient for formation of the regular shaped precursor particles. The regular shaped precursor particles may be between about 1 and about 20 microns, or between about 2 and about 50 microns, in diameter. They may be spherical or some other regular shape. The particular temperature may be between about 20 and about 60° C. The suitable time may be between about 5 and about 50 hours.

After the step of maintaining the second mixture to form the precursor particles, the second mixture is aged at a temperature and for a time effective to produce the regular shaped particles of solid foam. The temperature may be above ambient temperature, and may be a high temperature. It may be for sufficient time to convert the regular shaped precursor particles into the regular shaped particles of solid foam. It may be for sufficient time to solidify the regular shaped precursor particles. The temperature may be between about 30 and about 200° C. or more. This step may be conducted in an autoclave, particularly if the temperature is above about 100° C. The temperature of aging may be insufficient to boil any of the components of the second mixture under the conditions (e.g. pressure) pertaining during the step of aging. The time of aging may be between about 1 and about 48 hours.

The surfactant may be non-ionic, and may be polymeric. It may comprise a block copolymer. The concentration of the surfactant in the first mixture may be between about 1 and about 10% w/v.

The acid may be a strong acid. It may be a mineral acid or an organic acid. The concentration of the acid in the first mixture may be between about 1 and about 10% w/v.

The hydrophobic material may be a hydrophobic liquid. It may be a swelling agent. The concentration of the hydrophobic material in the first mixture may be between about 1 and about 10% w/v or v/v.

The hydrolysable silicon species may be a hydrolysable silane, a disiloxane having hydrolysable groups or it may be an oligosiloxane having hydrolysable groups. It may have more than 2 hydrolysable groups per molecule. The concentration of hydrolysable silicon species in the second mixture may be between about 1 and about 25% w/v or v/v. The hydrolysable silicon species may optionally be combined with a hydrolysable metal species, for example a metal alkoxide such as a metal methoxide, metal ethoxide, metal isopropoxide or metal t-butoxide. The metal may be for example aluminum, titanium, vanadium, tin or lead. The total amount of hydrolysable silicon species and hydrolysable metal species may be between about 1 and about 25% w/v or v/v. The ratio of hydrolysable metal species (if present) to hydrolysable silicon species may be between about 1:100 and about 1:1 on a weight or molar basis. If a hydrolysable metal species is included, then the silica foam may be a doped silica foam, for example if the metal is aluminum, the silica foam may be an aluminosilicate foam.

The pore size control agent may be a pore size increasing agent. The pore size control agent may comprise fluoride, for example sodium, potassium, ammonium or tetraalkylammonium fluoride. It may be added in solution, for example aqueous solution, or it may be added neat. If it is added in solution, the concentration of the solution may be between about 0.1 and about 2% w/w. The pore size control agent may be added to the second mixture at between about 100 and about 1000 ppm (w/w or w/v).

The process may additionally comprise the step of separating the regular shaped particles of solid foam from a liquid in which they are dispersed. The process may also comprise heating the particles of solid foam. The heating may comprise calcining the particles of solid foam. The beating may be for a time and at a temperature sufficient to calcine the particles of solid foam. The heating may be to a temperature of at least about 500° C. The process may additionally comprise hydrophobing the particles of solid foam (i.e. rendering them hydrophobic).

Oxides of additional metals may be incorporated into the regular shaped particles of solid foam adder the regular shaped particles have been formed (e.g. after the step of heating the particles). This may be accomplished by forming a mixture of an alkoxide of the additional metal and the regular particles in a solvent, for example absolute ethanol. The mixture may be heated, for example refluxed, and may be heated for sufficient time to incorporate an oxide of the additional metal into the regular shaped particles. The regular shaped particles may then be filtered and dried. Suitable additional metals include aluminum, tin, lead, titanium and vanadium, i.e. additional metal oxides such as alumina, titania or vanadia may be incorporated into the regular shaped particles.

In an embodiment, there is provided a process for making spherical particles of silica foam comprising:
  preparing an acidic solution of a surfactant; and
  adding a hydrophobic material to the acidic solution of the surfactant to form a first mixture;
  combining a hydrolysable silicon species with the first mixture to form a second mixture;
  maintaining the second mixture under conditions and for a sufficient time to form spherical precursor particles in the second mixture; and
  aging the second mixture at a temperature and for a time effective to produce the spherical particles of silica foam.

In another embodiment there is provided a process for making spherical particles of silica foam comprising:
  preparing a first mixture comprising water, an acid, a surfactant and a hydrophobic material;
  combining a hydrolysable silicon species with the first mixture to form a second mixture;
  maintaining the second mixture under conditions and for a sufficient time to form spherical precursor particles in the second mixture;
  aging the second mixture at a temperature and for a time effective to produce the spherical particles of silica foam dispersed in a liquid;
  separating the spherical particles of silica foam from the liquid; and
  heating the spherical particles of silica foam to at least about 500° C.

In another embodiment there is provided a process for making spherical particles of mixed metal oxide foam comprising:
  preparing a first mixture comprising water, an acid, a surfactant and a hydrophobic material;
  combining a hydrolysable silicon species with the first mixture to form a second mixture;
  maintaining the second mixture under conditions and for a sufficient time to form spherical precursor particles in the second mixture;
  aging the second mixture at a temperature and for a time effective to produce the spherical particles of silica foam dispersed in a liquid;
  separating the spherical particles of silica foam from the liquid;
  heating the spherical particles of silica foam to at least about 500° C.;
  cooling the spherical particles of silica foam;
  forming a third mixture comprising an alkoxide of an additional metal and the spherical particles of silica foam in absolute ethanol; and
  heating the third mixture for sufficient time to incorporate an oxide of the additional metal into the regular shaped particles.

The regular shaped particles having the oxide of the additional metal incorporated therein may then be filtered and dried.

In another embodiment there is provided a process for making spherical particles of silica foam comprising:
  preparing a first mixture comprising water, an acid, a surfactant and a hydrophobic material;
  combining a hydrolysable silicon species with the first mixture to form a second mixture;
  maintaining the second mixture under conditions and for a sufficient time to form spherical precursor particles in the second mixture;
  aging the second mixture at a temperature and for a time effective to produce the spherical particles of silica foam dispersed in a liquid;
  separating the spherical particles of silica foam from the liquid;
  heating the spherical particles of silica foam to at least about 500° C.; and
  hydrophobing the spherical particles of silica foam.

In another embodiment there is provided a process for making spherical particles of silica foam comprising:
  preparing a first mixture comprising water, an acid, a surfactant and a hydrophobic material;
  combining a hydrolysable silicon species with the first mixture to form a second mixture;
  maintaining the second mixture under conditions, at a temperature and for a time sufficient for formation of spherical precursor particles in the mixture;
  adding a pore size control agent to the second mixture;
  aging the second mixture at a temperature and for a time effective to produce the spherical particles of silica foam dispersed in a liquid;

separating the spherical particles of silica foam from the liquid;

heating the spherical particles of silica foam to at least about 500° C.; and hydrophobing the spherical particles of silica foam.

In a second aspect of the invention there is provided regular shaped particles of solid foam, said foam having a pore size such as to be suitable for use as an HPLC or GPC packing material. The foam may comprise cell-like mesopores connected by windows of a smaller size. The mean pore size of the foam may be greater than about 5 nm, or greater than about 10 nm. It may be between about 5 and about 100 nm or between about 10 and about 100 nm or between about 20 and about 50 nm. It may be mesoporous. The foam may comprise silica, aluminosilicate or silica doped with a metal such as aluminum, tin or lead. The foam may comprise mesoporous silica. The particles may have a mean particle diameter of between about 1 and about 20 microns or between about 2 and about 50 microns. The particles may have a narrow particle size distribution. They may be spherical, or may be some other shape. They may be hydrophilic or they may be hydrophobic. If they are hydrophobic, they may have alkyl or aryl groups on their surfaces.

The present invention also provides for regular shaped particles of solid foam when made by the process of the first aspect of the invention.

In a third aspect of the invention there is provided a process for preparing an HPLC column or a GPC column comprising at least partially filling a housing with regular shaped particles of solid foam according to the present invention. The housing may have means to prevent the particles from exiting the housing. The means may comprise for example a filter, a frit or some other porous material. The means may have a pore size smaller than the particles. The means and the housing may be capable of withstanding the pressures used in the column. They may be capable of withstanding a pressure of at least about 10 MPa. The at least partially filling may comprise forming a mixture, for example a slurry, of the particles with a filling liquid and locating the mixture in the housing. The process may also comprise:

increasing the pressure within the housing to a filling pressure passing a second liquid through the housing at the filling pressure; and reducing the pressure within the housing to ambient pressure.

The second liquid may be the same as the filling liquid, or it may be different from the second liquid.

The invention also provides an HPLC column or a GPC column when made by the process of the third aspect of the invention.

In a fourth aspect of the invention there is provided a method for separating a mixture of compounds comprising the step of applying the mixture of compounds to an HPLC or GPC column comprising regular shaped, for example spherical, particles of solid foam according to the invention. The column may be prepared by the process of the third aspect of the invention.

In a fifth aspect of the invention there is provided the use of regular shaped particles of solid foam as a catalytic support. The catalytic support may be for example used in a packed bed reactor. The particles may be regular shaped particles of solid foam, for example silica foam, according to the present invention.

The invention also provides a packed bed reactor comprising regular shaped particles of solid foam according to the present invention.

In a sixth aspect of the invention there is provided a solid catalyst comprising regular shaped particles of solid foam according to the invention and a catalytic material adsorbed or immobilised on and/or in said foam.

In a seventh aspect of the invention there is provided a method for catalyzing a reaction of a starting material to a product comprising exposing the stating material to a solid catalyst according to the sixth aspect of the invention. The starting material may be in solution in a solvent. The method may additionally comprise the step of separating the catalyst from the solvent.

BRIEF DESCRIPTION OF THE DRAWINGS

A preferred fond of the present invention will now be described by way of example with reference to the accompanying drawings wherein.

DETAILED DESCRIPTION OF THE PREFERRED EMBODIMENTS

The process for making particles of silica foam according to the present invention comprises:

preparing a first mixture comprising water, an acid, a surfactant and a hydrophobic material;

combining a hydrolysable silicon species with the first mixture to form a second mixture;

maintaining the second mixture under conditions and for a sufficient time to form regular shaped precursor particles; and aging the second mixture at a temperature and for a time effective to produce the regular shaped particles of solid foam.

The first mixture may be stirred, shaken, agitated, swirled, sonicated for a suitable time and at a suitable temperature before combining with the hydrolysable silicon species (e.g. after addition of the hydrophobic material). The suitable time may be between about 0.5 and about 10 hours, or may be more than 10 hours. It may be for between about 1 and 10, 2 and 10, 5 and 10, 0.5 and 5, 0.5 and 1, 1 and 5, 1 and 3 or 1.5 and 2.5 hours, and may be for about 0.5, 1, 1.5, 2, 2.5, 3, 3.5, 4, 4.5, 5, 5.5, 6, 6.5, 7, 7.5, 8, 8.5, 9, 9.5 or 10 hours. The suitable temperature may be between about 20 and about 60° C., or between about 20 and 50, 2 and 40, 30 and 60, 40 and 60, 30 and 50 or 35 and 45° C., and may be about 20, 25, 30, 35, 40, 45, 50, 55 or 60° C., or may be some other temperature, e.g. greater than about 60° C. It will be understood that the step of preparing the first mixture may comprise adding the components in many different orders. For example the hydrophobic material may be added to a mixture of water, the acid and the surfactant. The surfactant may be dissolved or dispersed in water, the acid added, and then the hydrophobic material added, or water, the acid and the hydrophobic material may be combined and the surfactant added, or the water and acid may be combined, the surfactant dissolved or dispersed in this combination and the hydrophobic material added to the solution or dispersion. The present invention encompasses all of the different orders of addition for preparing the first mixture.

In the present invention, various steps of agitation are or may be used. The method employed for these steps is not critical and any commonly used agitation equipment, such as a blade or paddle mixer, mechanical stirrer, magnetic stirrer etc. is suitable.

After the step of adding the hydrolysable silicon species to the first-mixture to form the second mixture, the second mixture may be maintained at a particular temperature for a suitable time before aging. Before the maintaining, the second mixture may be briefly mixed, stirred, swirled, shaken, sonicated or otherwise agitated, for example for between about 1 and about 10 minutes. During said maintaining, the second mixture may be static, or may be not mixed, not stirred, not swirled, not shaken and not sonicated, and may be maintained without agitation. It may be maintained with sufficiently mild agitation as to allow formation of the regular shaped precursor particles. For example the second mixture may be mildly stirred or swirled, provided that the swirling or stirring is sufficiently-mild to allow formation of the regular shaped precursor particles. The second mixture may be maintained without externally applied agitation. It will be understood that even without externally applied agitation, a mixture may be agitated, as a result of Brownian motion of droplets, particles etc. in the mixture, and to convection currents due to temperature differences within the mixture. The mixture may be agitated or stirred under low shear, for example using a magnetic or mechanical stirrer. The stirring rate may be less than about 10 rpm, or less than about 5, 2, 1, 0.5 or 0.1 rpm, or it may be about 0.01, 0.02, 0.03, 0.04, 0.05, 0.1, 0.2, 0.3, 0.4, 0.5, 0.6, 0.7, 0.8, 0.9, 1, 2, 3, 4, 5, 6, 7, 8, 9 or 10 rpm, or may be greater than 10 rpm, provided that it is sufficiently slow as to allow formation of the regular shaped precursor particles. The stirring rate to achieve low shear may depend on various factors, for example the size or length of the stirrer, the shape of the stirrer, the viscosity of the second mixture, the size of the vessel etc. The particular temperature may be between about 15 and about 75° C., or between about 20 and about 60° C., or between about 30 and 50, 15 and 30, 60 and 75, 30 and 75, 50 and 75, 15 and 50, and 45, 38 and 42, 20 and 40, 40 and 60, 30 and 40 or 40 and 50, and may be about 15, 20, 25, 30, 35, 40, 45, 50, 55, 60, 65, 70 or 75° C. The suitable time may be between about 5 and about 50 hours, or between about 10 and 30, 15 and 25, 18 and 22, 5 and 40, 5 and 30, 5 and 20, 10 and 50, 30 and 50 or 20 and 30 hours, and may be about 5, 10, 15, 20, 25, 30, 35, 40, 45, 50, 55 or 60 hours. The maintaining and the aging may each independently be conducted in an autoclave, an oven, a temperature controlled room or chamber, or some other convenient device for maintaining a constant or approximately temperature.

After the step of maintaining the second mixture to form the precursor particles, the second mixture is maintained (aged) at a temperature and for a time effective to produce the regular shaped particles of solid foam. The temperature may be between about 30 and about 200° C. or more, or between about 30 and 150, 30 and 100, 40 and 200, 40 and 150, 40 and 100, 50 and 150, 70 and 130, 80 and 120, 90 and 110, 95 and 105, 50 and 100, 100 and 200, 150 and 200, 60 and 130, 60 and 110, 110 and 160, 80 and 110, 90 and 110, 60 and 100, 60 and 80, 80 and 100, 90 and 100 or 90 and 105° C., and may be about 30, 34, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195 or 200° C. or may be greater than 200° C. The temperature may be insufficient to boil any of the components of the second mixture under the conditions (e.g. pressure) pertaining during the step of aging. The time may be between about 1 and about 48 hours, or between about 1 and 24, 1 and 12, 1 and 6, 6 and 48, 6 and 36, 6 and 24, 6 and 12, 12 and 48, 24 and 48, 12 and 26, 12 and 36, 18 and 30, 20 and 28, 22 and 26 or 18 and 30 hours, and may be about 1, 2, 3, 4, 5, 6, 9, 12, 15, 18, 21, 24, 27, 30, 36, 42 or 48 hours, or it may be greater than 48 hours. The time and temperature may be such that the regular shaped, for example spherical, particles of solid foam are formed. It will be understood that the reaction (i.e. production of the regular shaped particles of solid foam) will in general proceed at a higher rate (i.e. in a shorter time) at a higher temperature. Thus high temperatures, even those exceeding those described above, may be used, and may result in times shorter than those described above being effective to produce the regular shaped particles of solid foam. Similarly temperatures lower than those described above may be used, although correspondingly longer aging times may be required, possibly longer than those described above. The second mixture may be aged without agitation, i.e. without stirring, shaking, swirling or otherwise agitating, or without externally applied agitation. It may be aged with sufficiently mild agitation as to allow formation of the regular shaped precursor particles. For example the second mixture may be mildly stirred or swirled, provided that the swirling or stirring is sufficiently mild to allow formation of the regular shaped precursor particles. The second mixture may be aged without externally applied agitation.

The surfactant may be a non-ionic surfactant. It may be for example a polymeric non-ionic surfactant. It may comprise alkylene oxide groups, for example ethylene oxide and/or propylene oxide groups. It may comprise an ethylene oxide/propylene oxide (EO/PO) copolymer, for example a random copolymer or a block copolymer. EO/PO copolymers that may be used include those with a PO:EO ratio of greater than about 0.6. The PO:EO ratio may be greater than about 0.7, 0.8, 0.9 or 1, and may be between about 0.6 and about 5, or between about 0.6 and 4, 0.6 and 3, 0.6 and 2, 1 and 5, 2 and 5, 1 and 3, 0.7 and 2, 0.6 and 0.9, 0.7 and 0.8, 1.5 and 2, 1.6 and 1.9, 1.7 and 1.8 or 0.7 and 1, and may be about 0.6, 0.7, 0.75 0.8, 0.9, 1, 1.1, 1.2, 1.3, 1.4, 1.5, 1.6, 1.7, 1.75, 1.8, 1.9, 2, 2.5, 3, 3.5, 4, 4.5 or 5. A suitable surfactant may be for example EO20/PO30/EO20 (Pluronic P65, BASF) or EO20/PO70/EO20 (Pluronic P123, BASF). The concentration of the surfactant in the first mixture may be between about 1 and about 10% w/v, or may be between about 1 and 5, 1 and 2, 2 and 10, 5 and 10, 2 and 7 or 4 and 6% w/v, and may be about 1, 2, 3, 3.5, 4, 4.5, 5, 5.5, 6, 6.5, 7, 8, 9 or 10% w/v.

The acid may be a strong acid. It may be a mineral acid, for example hydrochloric acid, sulfuric acid or phosphoric acid, or may be an organic acid such as trifluoroacetic acid or methanesulfonic acid. The concentration of the acid in the first mixture may be between about 1 and about 10% w/v, or may be between about 1 and 5, 1 and 2, 2 and 10, 5 and 10, 2 and 7, 2 and 6, 3 and 4 or 4 and 6% w/v, and may be about 1, 1.5, 2, 2.5, 3, 3.5, 4, 4.5, 5, 5.5, 6, 6.5, 7, 7.5, 8, 8.5, 9, 9.5 or 10% w/v.

The hydrophobic material may be a hydrophobic liquid. It may be a swelling agent. The hydrophobic liquid may be an organic liquid. It may be aromatic or aliphatic, or it may be a halo compound or some other hydrophobic liquid. Suitable aliphatic liquids include aliphatic hydrocarbons of between about 6 and about 20 carbon atoms, and the aliphatic hydrocarbons may be branched or straight chain. The aliphatic liquid may be a mixture of aliphatic hydrocarbons. The aliphatic hydrocarbons may have between 6 and 20, 6 and 18, 6 and 16, 6 and 12, 8 and 20, 12 and 20, 16 and 20, 8 and 16 or 10 and 18 carbon atoms, and may have 6, 8, 10, 12, 14, 16, 18 or 20 carbon atoms. Suitable aromatic liquids include toluene, xylene, trimethylbenzene, ethylbenzene, diethylbenzene, cumene or a mixture of aromatic liquids. The aromatic liquid may have between about 6 and about 20 carbon atoms, or between 6 and 18, 6 and 16, 6 and 12, 8 and 20, 12 and 20, 16 and 20, 8 and 16 or 10 and 18 carbon atoms, and may have 6, 7, 8, 9, 10, 11, 12, 13, 14, 15, 16, 17, 18, 19 or 20 carbon atoms. It may comprise a mixture of hydrophobic compounds. The boiling point of the hydrophobic material may be greater than the temperature for condensation of the hydrolysable silicon species. It may be greater than about 50, 60, 70, 80, 90, 100 or 110° C., and may be about 50, 60, 70, 80, 90, 100, 110, 120, 130, 140, 150, 160, 170, 180, 190 or 200° C., or it may be greater than 200° C.

The concentration of the hydrophobic material in the first mixture may be between about 1 and about 10% w/v or v/v, or may be between about 1 and 5, 1 and 2, 2 and 10, 5 and 10, 2 and 7, 4 and 5, 3 and 6 or 4 and 6% w/v, and may be about 1, 1.5, 2, 2.5, 3, 3.5, 4, 4.5, 5, 5.5, 6, 6.5, 7, 7.5, 8, 8.5, 9, 9.5 or 10% w/v. The ratio of hydrophobic material to surfactant may be between about 1:1 and about 1:4 on a w/w or v/v basis, or may be between about 1:1 and 1:3, 1:1 and 1:2, 1:1 and 1:1.5, 1:1 and 1:1.3, 1:1.1 and 1:1.2, 1:2 and 1:4, 1:2 and 1:3 or 1:3 and 1:4, and may be about 1:1, 1:1.1, 1:1.15, 1:1.2, 1:1.25, 1:1.3, 1:1.35, 1:4, 1:1.45, 1:1.5, 1:1.75, 1:2, 1:2.5, 1:3, 1:3.5 or 1:4 on a w/w or v/v basis, or may be some other ratio.

The hydrolysable silicon species may be a crosslinkable silicon species. It may be a hydrolysable silane, a disiloxane having hydrolysable groups (for example hexaethoxydisiloxane) or it may be an oligosiloxane having hydrolysable groups (for example ethyl polysilicate). It may have more than 2 hydrolysable groups per molecule, and may have 3, 4, 5, 6 or more than 6 hydrolysable groups per molecule. The concentration of hydrolysable silicon species in the second mixture may be between about 1 and about 25% w/v or v/v, or between about 5 and 15, 7 and 13, 8 and 12, 9 and 11, 1 and 20, 1 and 10, 1 and 5, 5 and 25, 10 and 25, 15 and 25, 5 and 20, 5 and 15, 5 and 10 or 10 and 15% w/v or v/v, and may be about 1, 2, 3, 4, 5, 6, 7, 8, 9, 10, 11, 12, 13, 14, 1, 5 16, 17, 18, 19, 20, 21, 22, 23, 24 or 25% w/v or v/v. The hydrolysable groups may be alkoxy groups, aryloxy groups, amido groups, enoloxy groups or some other suitable hydrolysable group, or mixture of hydrolysable groups. Suitable hydrolysable groups may comprise for example methoxy, ethoxy, n-propoxy, n-butoxy, isopropoxy, isobutoxy, phenoxy, benzamido or isopropenyloxy. On partial or complete hydrolysis, the silane may generate a hydrolysis product comprising silanol groups. The hydrolysis product may also comprise oligomers which may comprise silanol groups and/or hydrolysable groups. The ratio of hydrolysable silicon species to surfactant may be between about 3:1 and about 1:1 on a w/w or v/v basis, and may be between about 3:1 and 2:1, 2, 5:1 and 2:1, 2:1 and 1:1, 2.5:1 and 1.5:1 or 2:1 and 1.5:1, and may be about 3:1, 2.9:1, 2.8:1, 2.7:1, 2.6:1, 2.5:1, 2.4:1, 2.3:1, 22:1, 2.1:1, 2:1, 1.9:1, 1.8:1, 1.7:1, 1.6:1, 1.5:1, 1.4:1, 1.3:1, 1.2:1, 1.1:1 or 1:1 on a w/w or v/v basis, or may be some other ratio. The ratio of hydrolysable silicon species to hydrophobic material may be between about 5:1 and about 1:1, or between about 5:1 and 2:1, 5:1 and 3:1, 5:1 and 4:1, 4:1 and 1:1, 4:1 and 2:1, 4:1 and 3:1, 3:1 and 1:1, 3:1 and 2:1 or 2:1 and 1:1, and may be about 5:1, 4.5:1, 4:1, 3.5:1, 3:1, 2.5:1, 2:1, 1.5:1 or 1:1 on a w/w or v/v basis, or may be some other ratio.

The pore size control agent may comprise fluoride, and may be an alkali fluoride, for example sodium fluoride, potassium fluoride, ammonium fluoride or tetraalkylammonium fluoride (where the alkyl group may be any convenient alkyl group, for example C1 to C6 or greater branched or straight chain alkyl such as methyl, ethyl, propy), butyl or a mixture of alkyl groups). It may be added in solution, for example aqueous solution, and the concentration of the solution may be between about 0.1 and about 2% w/v, or between about 0.2 and 0.8, 0.3 and 0.7, 0.4 and 0.6, 0.4 and 0.5, 0.1 and 1, 0.1 and 0.5, 0.5 and 2, 1 and 2, 0.5 and 1.5, 0.5 and 1, 0.2 and 1, 0.3 and 0.7 or 0.4 and 0.6% w/v, and may be about 0.1, 0.2, 0.3, 0.35, 0.4, 0.45, 0.46, 0.5, 0.55, 0.6, 0.7, 0.8, 0.9, 1, 1.1, 1.2, 1.3, 1.4, 1.5, 1.6, 1.7, 1.8, 1.9 or 2% w/v. The pore size control agent may be added to the second mixture at between about 100 and about 1000 ppm (w/w or w/v), or between about 300 and 700, 400 and 600, 450 and 550, 100 and 500, 100 and 200, 200 and 1000, 500 and 1000, 200 and 800 or 400 and 600 ppm (w/w or w/v), and may be added at about 100, 150, 200, 250, 300, 350, 400, 450, 500, 550, 600, 650, 700, 750, 800, 850, 900, 950 or 1000 ppm (w/w or w/v).

The process may additionally comprise the step of separating the particles of solid foam from a liquid in which they are dispersed. The process may also comprise heating the particles of solid foam. The heating may comprise calcining the particles of solid foam. The beating may be to a temperature of at least about 500° C., or at least about 550, 600, 650, 700, 800, 850 or 900° C., or between about 500 and about 1000° C., or between about 500 and 800, 500 and 700, 700 and 1000, 600 and 800 or 500 and 600° C., and may be to a temperature of about 500, 510, 520, 530, 540, 550, 560, 570, 580, 590, 600, 650, 700, 800, 850, 900, 950 or 1000° C., or may be to greater than 1000° C. The heating may be for between about 1 and about 12 hours, or between about 1 and 6, 1 and 4, 4 and 12, 6 and 12, 5 and 7 or 4 and 8 hours, and may be for about 1, 1.5, 2, 2.5, 3, 3.5, 4, 4.5, 5, 5.5, 6, 6.5, 7, 7.5, 8, 8.5, 9, 9.5, 10, 10.5, 11, 11.5 or 12 hours, or for greater than 12 hours. The heating may be for a time and at a temperature sufficient to calcine the particles of solid foam.

An oxide of an additional metal may be incorporated into the regular shaped particles of the present invention after the regular shaped particles (e.g. silica particles) have been formed. This may be performed after the step of heating (e.g. calcining) the particles. After the step of heating, the particles should be cooled before the oxide of the additional metal is incorporated. They may be cooled to below about 100° C., or below about 90, 80, 70 or 60° C., and may be cooled to about 20, 30, 40, 50, 60, 70, 80, 90 or 100° C., or to room temperature or to some other temperature. The incorporation of the oxide of the additional metal may be performed before the step of hydrophobing (if the step of hydrophobing is performed). The incorporation of the oxides of the additional metal may be accomplished by forming a mixture of an alkoxide of the additional metal and the particles in a solvent, such as an alcohol. The alcohol may be methanol, ethanol, propanol, isopropanol, butanol or some other suitable alcohol. It may be absolute ethanol. The mixture may then be heated to a temperature between about 50 and about 150° C., or between about 50 and 120, 50 and 100, 50 and 80, 80 and 150, 100 and 150, 120 and 150, 60 and 100, 60 and 90 or 70 and 90° C., and may be heated to about 50, 55, 60, 65, 70, 75, 80, 85, 90, 95, 100, 110, 120, 130, 140 or 150° C. or some other temperature. It may be heated to the boiling point of the solvent. It may be refluxed in the solvent. It may be maintained at the temperature (e.g. at reflux) for between about 1 and about 48 hours, or between about 1 and 36, 1 and 24, 1 and 12, 12 and 48, 24 and 48, 36 and 48, 12 and 36 or 12 and 24 hours, and may be maintained at the temperature for about 1, 6, 12, 18, 24, 30, 3, 42 or 48 hours (e.g. overnight). It may be heated for sufficient time to incorporate an oxide of the additional metal into the particles. The particles may then be filtered, for example using a filter paper, a sintered glass funnel etc., either under vacuum or under gravity. Alternatively the particles may be separated using centrifugation, settling and decanting or some other method. They may then be dried. They may be dried by heating to a temperature between about 50 and about 150° C., or between about 50 and 120, 50 and 100, 50 and 80, 80 and 150, 100 and 150, 120 and 150, 60 and 100 or 70 and 90° C., and may be dried by beating to about 50, 55, 60, 65, 70, 75, 80, 85, 90, 95, 100, 110, 120, 130, 140 or 150° C. or some other temperature. They may be dried by passing a gas, e.g. air, nitrogen, carbon dioxide, argon (optionally dried) over and/or through the particles. They may be dried by applying a vacuum to the particles. Suitable additional metals include aluminum, tin, lead, titanium and vanadium, i.e. additional metal oxides such as alumina, titania or vanadia may be incorporated into the particles as described above.

The process of the invention may additionally comprise hydrophobing the particles of solid foam (i.e. rendering them hydrophobic). Before the hydrophobing, the particles of solid foam may be treated with an aqueous acid, commonly a strong aqueous acid (e.g. an aqueous mineral acid) such as hydrochloric acid, sulfuric acid, nitric acid or phosphoric acid. This may increase the number of silanol groups on the particles of solid foam that are available to be hydrophobed, or reacted with a hydrophobing agent. The step of hydrophobing may comprise exposing the particles of solid foam to a hydrophobing agent, and may comprise reacting the particles of solid foam with the hydrophobing agent. The hydropbobing agent may be an alkyl alkoxysilane, an alylhalosilane, a disilazane such as hexamethyldisilazane, a siloxane, for example a disiloxane such as hexamethyldisiloxane, or a cyclic siloxane, or it may be some other type of hydrophobing agent. Suitable hydrophobing agents are well known in the art, and may include for example dimethyloctylchlorosilane, dimethyloctadecylchlorosilane, dimethylphenylchlorosilane, trimethylchlorosilane, trimethylmethoxysilane, dimethyldimethoxysilane, octyltrimethoxysilane, octadecyltrimethoxysilane, hexamethyldisiloxane, octamethylcyclotetrasiloxane, decamethylcyclopentasiloxane, hexamethyldisilazane and mixtures of hydrophobing agents. The exposing may be for a period of about 1 and about 24 hours, or for between about 1 and 12, 1 and 6, 6 and 24, 12 and 24, 18 and 24, 6 and 18 or 12 and 18, and may be for about 1, 2, 3, 4, 5, 6, 9, 12, 15, 18, 21 or 24 hours, or for more than about 24 hours. The exposing may be at a temperature between about 20 and about 80° C., or between about 20 and 60, 20 and 40, 40 and 80, 40 and 60 or 30 and 50° C., and may be at about 20, 30, 40, 50, 60, 70 or 80° C. The hydrophobing agent may be used in solution, and the solution may also comprise a catalyst, for example an amine catalyst such as triethylamine or some other tertiary amine.

The invention also provides regular shaped, for example spherical, particles of solid foam said particles having a pore size such as to be suitable for use as an HPLC packing material. The mean pore size (e.g. cell pore size) may be greater than about 5 nm, or greater than about 10 nm. It may be between about 5 and about 100 nm or between about 5 and 50, 5 and 20, 10 and 100, 50 and 100, 20 and 30, 20 and 25, 2 and 22, 25 and 30, 27 and 30, 27 and 29, or 10 and 50 nm. The pore size may be about 5, 10, 15, 20, 21, 22, 23, 24, 25, 26, 27, 28, 29, 30, 35, 40, 45, 50, 55, 60, 65, 70, 75, 80, 85, 90, 95 or 100 nm. The particles may have a distribution of different pore sizes. The different pore sizes may be between about 5 and about 100 nm. The particles with a distribution of different pore sizes may be used for example in size exclusion chromatography (SEC).

The particles of regular shaped solid foam may have a mean particle diameter of between about 1 and about 20 microns, or between about 2 and about 50, 20 and 50, 10 and 50, 2 and 40, 1 and 10, 1 and 5, 1 and 2, 2 and 20, 2 and 10, 3 and 8, 4 and 7, 4 and 6, 5 and 20, 10 and 20, 2 and 10 or 5 and 10 microns, and may have a mean particle diameter of about 1, 2, 3, 4, 5, 6, 7, 8, 9, 10, 11, 12, 13, 14, 15, 16, 17, 18, 19; 20, 25, 30, 35, 40, 45 or 50 microns, or may be less than 1 micron or greater than 50 microns. The particles of solid foam may have a narrow particle size distribution. There may be less than about 50% of particles having a particle size more than 10% different from (greater than or less than) the mean particle size, or there may be less than about 45, 40, 35, 30, 25, 20, 15, 10 or 5% of particles having a particle size more than 10% different from the mean particle size, and may be about 1, 2, 3, 4, 5, 10, 15, 20, 25, 330, 35, 40, 45 or 50% of particles having a particle size more than 10% different from the mean particle size. The particles of solid foam may be spherical, or they may be some other shape, such as ovoid, ellipsoid, cubic, rhomboidal, prismatic, or parallelepiped (for example rectangular parallelepiped). The particles may be hydrophilic or they may be hydrophobic. If they are hydrophobic, they may have alkyl groups (for example from alkylsilyl groups) or aryl groups (for example from arylsilyl groups) on their surfaces. The AA groups may comprise C1 to C20 straight chain or branched alkyl groups, for example methyl, ethyl, octyl, octadecyl or isopropyl. The arylsilyl groups may comprise for example phenyl or tolyl groups. The particles of solid foam may have trimethylsilyl groups on their surfaces. The solid foam may comprise cell-like mesopores connected by windows of a smaller size. The ratio of the size of the mesopores and the size of the windows may be between about 10:1 and about 1.5:1, or between about 10:1 and 2:1, 10:1 and 5:1, 5:1 and 1.5:1, 3:1 and 1.5:1, 5:1 and 3:1 or 8:1 and 4:1, and may be about 10:1, 9:1, 8:1, 7:1, 6:1, 5:1, 4.5:1, 4:1, 3.5:1, 3:1, 2.5:1, 2:1 or 1.5:1, or may be some other ratio. The solid foam may have some other structure. The size of the windows (i.e. window pore size) may be greater than about 2, greater than 5 nm, or greater than about 10 nm. It may be between about 2 and about 100 nm or between about 2 and 50, 2 and 10, 5 and 50, 5 and 20, 10 and 20, 10 and 15, 10 and 12, 15 and 20, 15 and 18, 15 and 17, 10 and 100, 50 and 100 or 10 and 50 nm. The window size may be about 2, 3, 4, 5, 10, 11, 12, 13, 14, 15, 16, 17, 18, 19, 20, 25, 30, 35, 40, 45, 50, 55, 60, 65, 70, 75, 80, 85, 90, 95 or 100 nm. The particles may have a distribution of different window sizes. The different window sizes may be between about 2 and 100 nm.

The particles may have a pore volume of between about 0.5 and about 5 cm$^3$/g, or between about 0.5 and 4, 0.5 and 3, 0.5 and 2, 1 and 5, 2 and 5, 3 and 5, 1 and 3, 1 and 2, 2 and 3, 1.5 and 2, 1.5 and 1.7, 2 and 2.5, 2.2 and 2.4 or 2 and 2.4, and may have a pore volume about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4; 4.5 or 5 cm$^3$/g, or more than about 5 cm$^3$/g. The particles may gave a specific surface area of between about 100 and about 1000 m$^2$/g, or between about 100 and 500, 100 and 200, 200 and 1000, 500 and 1000, 200 and 800, 200 and 500, 500 and 800, 500 and 700, 500 and 600, 550 and 600, 550 and 570, 600 and 800, 650 and 750, 670 and 730 or 690 and 71.0 m$^2$/g, and may have a specific surface area of about 100, 150, 200, 250, 300, 350, 400, 450, 500, 510, 520, 530, 540, 550, 560, 570, 580, 590, 600, 610, 620, 630, 640, 650, 660, 670, 680, 690, 700, 710, 720, 730, 750, 750, 800, 850, 900, 950 or 1000 m$^2$/g, or may have a specific surface area of less than about 100 or greater than about 1000 m$^2$/g.

The invention also provides a process for preparing an HPLC column or a GPC column comprising at least partially filling a housing with regular shaped, for example spherical, particles of solid foam according to the present invention. The housing may have means to prevent the particles from exiting the housing. The means may comprise for example a filter, a frit or some other porous material. The means may have a pore size smaller than the particles of solid foam, and the pore size of the means may be about 10% of the particle size of the solid foam, or about 20, 30, 40, 50, 60, 70 or 80% of the particle size of the solid foam, or it may be less than about 20, 30, 40, 50, 60, 70 or 80% of the particle size of the solid foam. The means and the housing may be capable of withstanding the pressures used in the column. They may be capable of withstanding a pressure of at least about 10 MPa, or at least about 15, 20, 25, 30, 35, 40, 45 or 50 MPa, or greater than about 50 MPa. The at least partially filling may comprise forming a mixture, for example a slurry, a suspension or a dispersion, of the particles with a filling liquid and locating the mixture in the housing. The process may also comprise:

increasing the pressure within the housing to a filling pressure passing a second liquid through the housing at the filling pressure; and reducing the pressure within the housing to ambient pressure.

The filling pressure may be between about 10 and about 50 MPa, or between about 10 and 40, 10 and 30, 20 and 50, 30 and 50, 20 and 40, 33 and 37 or 30 and 40 MPa, and may be about 10, 15, 20, 25, 30, 35, 40, 45 or 50 MPa. The second liquid may be the same as the filling liquid, or it may be different from the second liquid. The filling liquid and the second liquid may be miscible. They may, independently, be any suitable organic liquid, for example an alcohol, a hydrocarbon, a ketone, an ester or a halocarbon. Suitable liquids include methanol, ethanol, isopropanol, acetone, butanone, hexane, heptane, toluene, xylene, chloroform, dichloromethane and dichloroethane, or mixtures of liquids. The steps of increasing and reducing the pressure may be conducted rapidly or slowly.

The invention also provides the use of regular shaped, for example spherical, particles of solid foam for separating a mixture of compounds. The use may comprise applying the mixture of compounds to an HPLC column comprising the particles of solid foam. The HPLC column may be prepared by the process of the third aspect of the invention. Separation of compounds using column chromatography is well known in the art. The separation may be on the basis of affinity for the particles, or it may be on the basis of molecular size or hydrodynamic volume, or on some other basis.

The regular shaped, for example spherical, particles of solid foam may also be used as a catalytic support. The catalytic support may be for example used in a packed bed reactor. In this application, the particles of solid foam according to the reaction may have a catalytic material adsorbed or immobilized on and/or in the particles. In catalyzing a reaction of a starting material to a product using the catalytic support, the starting material may be exposed to a solid catalyst according to the invention. The starting material may be in solution in a solvent. The solvent may be any convenient solvent for example an organic solvent, which can dissolve the starting material, and preferably can also dissolve the product. The exposing may comprise combining the solid catalyst with the starting material, optionally in solution, and may comprise stirring, swirling, agitating, sonicating or shaking the solid catalyst with the starting material. Alternatively it may comprise passing the starting material, or a solution thereof, through the solid catalyst, for example in a column or reactor bed. The catalyst may be separated from the solvent after the exposing. The separating may comprise one or more of settling, filtering, decanting, centrifuging, ultracentrifuging, dialyzing or some other form of separating.

Example

Synthesis and Functionalization of Spherical MCF Particles

Spherical MCF particles were synthesized by modifying the conventional MCF synthesis method. 4 g of triblock copolymer P123 were dissolved in an acidic solution (10 ml of HCl and 65 ml of H$_2$O). 3.4 ml of trimethylbenzene (TMB) were then added and the resulting solution was heated to 37-40° C. with vigorous stirring. After 2 hr of stirring, 9.2 ml of tetraethoxysilane (TEOS) were added and stirred for 5 min. The solution was transferred to an autoclave, and aged at 40° C. for 20 hr under a static condition. It was then aged at 100° C. for 24 hr. The resulting precipitate was filtered, washed with water and ethanol, and dried. The white powder obtained was calcined in air at 550° C. for 6 hr.

To increase the pore size, NH$_4$F (46 mg) in 10 ml of water was added to the solution prior to aging at 100° C. The other procedures remained the same as described above.

Dimethyloctylchlorosilane was used to obtain C8-functionalized spherical MCF particles. Triethylamine (0.418 ml, 3 mmol) was added to MCF (1.0 g) dispersed in 10 ml of toluene. Dimethyloctylchlorosilane (0.473 ml, 2 mmol) was then added to the mixture. After stirring at room temperature for 4 hr, the mixture, was heated at 60° C. overnight. The C8-functionalized MCF was collected by filtration, and washed with toluene and methanol.

Characterization of Spherical MCF Particles

Scanning electron microscopy (SEM) was performed with a JEOL JSM-7400F electron microscope. The nitrogen adsorption-desorption isotherms were obtained using a Micromeritics ASAP 2020M system; the samples were degassed for 10 hr at 150° C. before analysis. The carbon content in the functionalized MCF was obtained with CE440 CHN Analyzer (Exeter Analytical).

Testing of HPLC Reverse Column Packed with C8-Functionalized Spherical MCF Particles The C8-functionalized MCF (0.7 g) was dispersed in isopropanol and then poured into an empty HPLC column (100 mm×4.6 mm). The back pressure was increased slowly to 5000 psi. Isopropanol was introduced through the column continuously at that high pressure for 2 hr, and then the back pressure was slowly decreased to 0 psi. NH$_4$F-treated spherical MCF particles with a larger pore size was also subjected to this column packing procedure to give a HPLC reverse column. The packed columns were used directly for the separation of uracil and aromatic compounds (benzene, naphthalene and biphenyl) in a HPLC system (Alliance 2695, Waters). Water/methanol (35/65 v/v) was used as the mobile phase with a flow rate of 1 ml/min and a column-temperature of 30° C.

Results and Discussion

Synthesis of Spherical MCF Particles

MCF has a 3-dimensional, continuous porous structure with ultralarge, cell-like mesopores connected with each other by windows of a smaller opening. The cell and window pore sizes could be controlled by the amounts of TMB and $NH_4F$ added, and the aging time.

Figure 1:
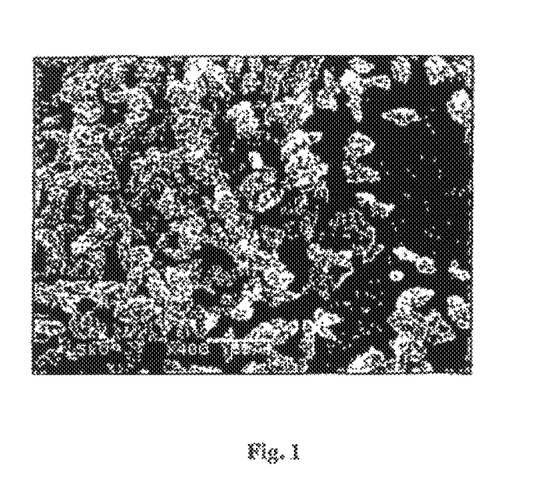
FIG. 1 is a scanning electron micrograph (SEM) of conventional MCF particles made without addition of $NH_4F$.

FIG. 1 shows the irregular morphology of MCF particles of >10 μm prepared by the conventional method (Scheme 1).

TABLE 1

Characteristics of spherical MCF-3 particles (aged without $NH_4F$) and spherical MCF-4 particles (aged with $NH_4F$)

| | Spherical MCF-3 | Spherical MCF-4 |
|---|---|---|
| Surface Area [$m^2/g$] | 701 | 561 |
| Window Pore Size [nm] | 11 | 16 |
| Cell Pore Size [nm] | 21 | 28 |
| Average Particle Size [μm] | 5 | 5 |
| Pore Volume [$cm^3/g$] | 1.6 | 2.3 |

$NH_4F$ has been previously used to increase the pore size of MCF, and the final MCF particle morphology was reportedly formed during aging at 100° C. However, the inventors found that the MCF particle morphology was determined prior to aging at 100° C. In the conventional method, $NH_4F$ was added prior to stirring at 40° C. (see Scheme 1), which resulted in the rapid condensation of silica and the formation of irregular MCF particles. Therefore, in the present synthesis, $NH_4F$ was Scheme 1. Typical synthesis procedure for MCF.

Figure 2:
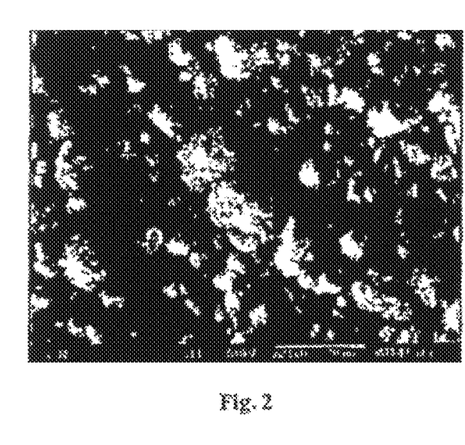
FIG. 2 is an SEM micrograph of spherical MCF-1 particles as described in the example.

Several synthesis conditions were varied in an attempt to obtain spherical particle morphology. The inventors observed that, in most cases, stirring under acidic condition with copolymer P123, provided severely aggregated particles. Consequently in subsequent experiments static conditions were applied before the formation of particles. First, eight times more water and four times more HCl were used to decrease the P123 and TEOS concentrations, and a static condition was applied towards aging at 40° C. for 20 hr. Irregular MCF particles (designated MCF-1) were obtained (FIG. 2).

Figure 3:
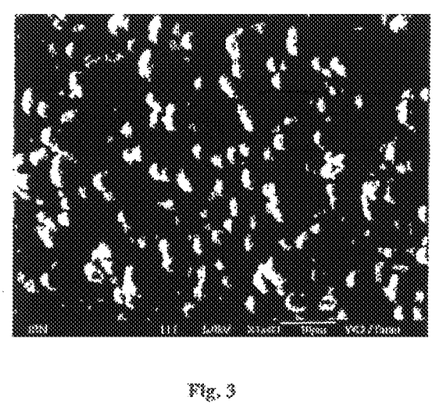
FIG. 3 is an SEM micrograph of aggregated spherical MCF-2 particles as described in the example made-without addition of $NH_4F$.

Next, the original P123 and HCl concentrations were employed, and a static condition was applied towards aging at 40° C. for 20 hr. The MCF particles obtained (designated MCF-2) were spherical, but mostly aggregated (FIG. 3). They have a particle size of about 3 μl.

Figure 4:
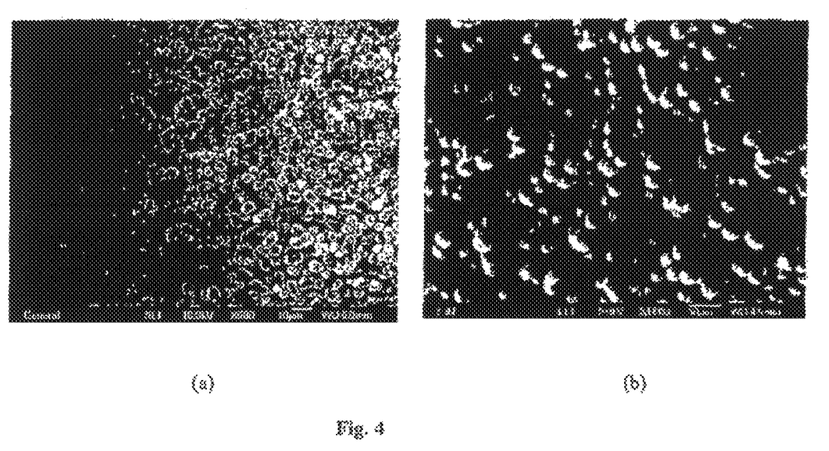
FIG. 4 shows SEM micrographs of (a) spherical MCF-3 particles (aged without $NH_4F$) and (b) spherical MCF-4 particles (aged with $NH_4F$), as described in the example.
Figure 5:
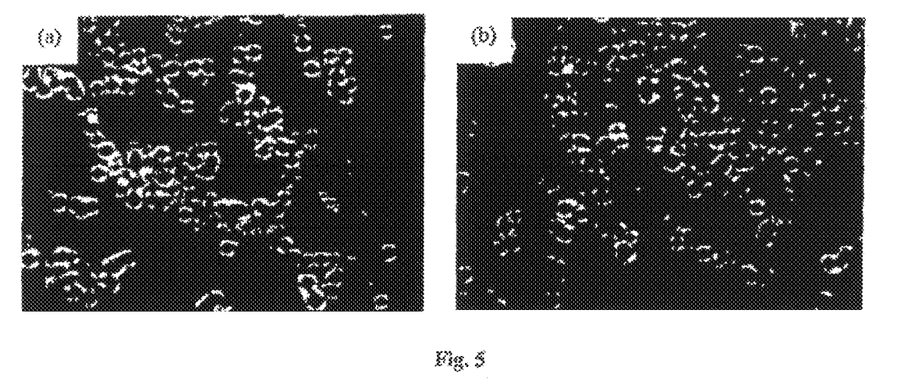
FIG. 5 shows optical microscope images of spherical MCF-4 particles (a) before and (b) after aging at 100° C. with $NH_4F$, as described in the example.

Lastly, a high P123 concentration and a smaller amount of HCl were employed, and a static condition was applied towards aging at 40° C. for 20 hr. Specifically, the amount of water added was decreased from 130 mL to 65 mL, and the aqueous HCl (32%) solution added was decreased from 20 mL to 10 mL, while the amount of P123 introduced (4.0 g) remained unchanged (see Scheme 2).

added to the solution only after aging at 40° C. and just before aging at 100° C. (see Scheme 2). The resultant particles are shown in FIG. 4(b). Optical microscope images of MCF samples before and after aging at 100° C. with $NH_4F$ (see FIG. 5) confirmed that their particle morphology remained essentially unchanged by this step. Adding $NH_4F$ at the later stage of aging (i.e. at 100° C.) produced a similar pore size enlargement effect as adding $NH_4F$ prior to aging at 40° C.

Figure 6:
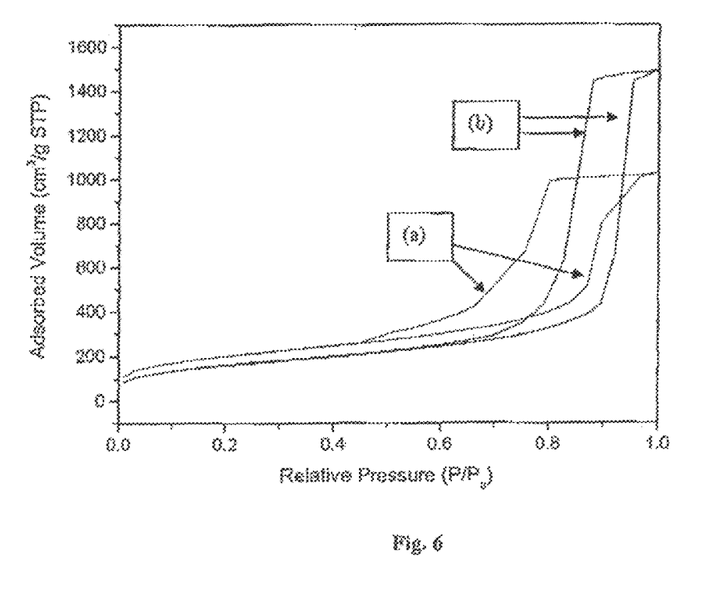
FIG. 6 is a graph showing nitrogen adsorption-desorption isotherms of (a) spherical MCF-3 particles (aged without $NH_4F$), and (b) spherical MCF-4 particles (aged with $NH_4F$)

FIG. 4(b) shows the spherical MCF samples obtained with $NH_4F$ (designated MCF-4) following Scheme 2. The nitrogen adsorption-desorption isotherms of spherical MCF samples obtained with and without $NH_4F$ are shown in FIG. 6. Table 1 indicates that lower BET surface areas, and larger pore sizes and pore volume were obtained with $NH_4F$ (MCF-4).

Surface Modification of Spherical MCF

Figure 7:
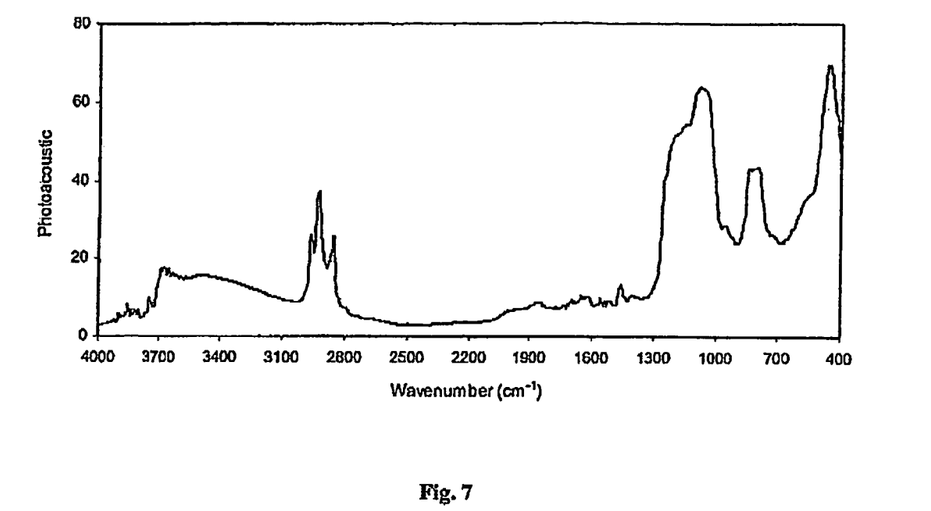
FIG. 7 is an FTIR spectrum of C8-MCF-3, as described in the example.

The spherical MCF was modified with octyldimethylchlorosilane or octadecyldimethylchlorosilane. The Fourier-transform infrared (FTIR) spectra of C8 functionalized spherical MCF (C8-MCF) and of C18-modified spherical MCF (C18-MCF) showed strong peaks at ~2800-3000 $cm^{-1}$ from the alkyl groups, as well as a significantly reduced silanol peak at 3700 $cm^{-1}$, indicating the successful surface modification (FIG. 7). C8-MCF or C18-MCF was then Scheme 2. Modified procedure for the synthesis of spherical MCF particles.

Figure 8:
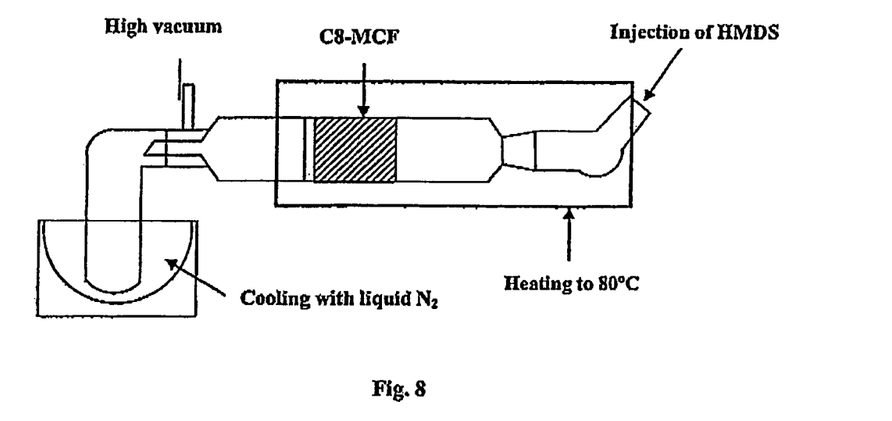
FIG. 8 is a diagrammatic representation of a set-up for the TMS capping of C8-MCF samples as described in the example.

Spherical MCF particles were obtained without $NH_4F$ (designated MCP-3), and aggregation of particles was reduced (see FIG. 4(a)). Their BET surface areas and pore sizes (see Table 1) were similar to the conventional MCF particles. A very small amount of ultrafine particles (<1 μm) was removed by centrifuging at a low speed after ultrasonication.

degassed, so that the remaining silanol groups could be capped with trimethylsilyl (TMS) species by introducing hexamethyldisilazane (HMDS) under vacuum. The vacuum-applied flask was placed directly in an oven at 75° C. for 4 hr, and the excess HMDS vapor was removed under vacuum. The TMS capping could also be performed with a different set-up (FIG. 8). TMS-capped C8-MCF-3 and TMS-capped C8-MCF-4 showed carbon contents of 15% and 13.4%, respectively. The differences in carbon loading could be attributed to the differences in the BET surface areas between spherical MCF-3 and MCF-4 particles (701 m²/g vs. 561 m²/g) (see Table 1). In contrast, commercial C8-silica usually has a carbon loading of <100%. TMS-C18-MCF-4 also showed high carbon contents of 22.9%

Figure 9:
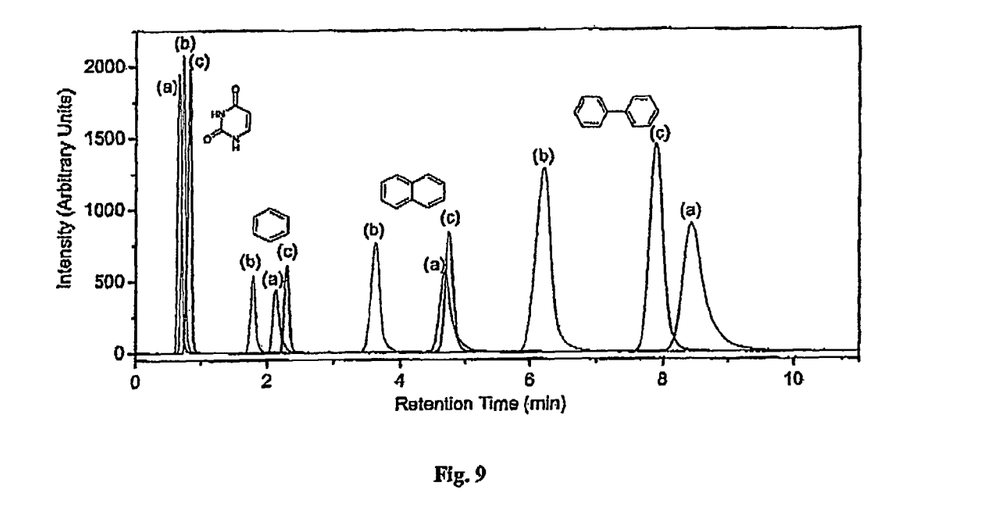
FIG. 9 is a graph illustrating separation of uracil, benzene, naphthalene and biphenyl over reverse columns of (a) TMS-capped C8-MCF-3, (b) TMS-capped C8-MCF-4, and (c) Adsorbosphere XL, as described in the example.

Testing of HPLC Reverse Phase Columns Packed with C8-Modified Spherical MCF Particles and with C18-Modified Spherical MCF Particles TMS-capped C8-MCF-3 and TMS-capped C8-MCF-4 particles were packed separately into empty HPLC columns of 4.6 mm×100 mm and TMS-capped C18-MCF-4 particles were packed into empty HPLC columns of 4.6 mm×150 mm using a commercial slurry packer. The TMS-capped C8-MCF-3 reverse column successfully separated uracil, benzene, naphthalene and biphenyl; four non-overlapping, symmetrical peaks were obtained in the chromatograph (FIG. 9). Its peak retention times were quite similar to that of the commercial reverse column (Adsorbosphere XL, C8, 5 µm, 4.6 mm×100 mm, Alltech) despite its shorter column length. This could be attributed to the much higher surface area of MCF-3 compared to commercial silica. TMS-capped C8-MCF-3 reverse column gave rise to slightly broader peaks compared to the commercial reverse column. Sharper peaks with less tailing could be obtained by optimizing the reaction conditions and the packing parameters of spherical MCF particles.

The TMS-capped C8-MCF-4 reverse column also showed four completely separated, symmetrical peaks. It gave rise to shorter peak retention times than TMS-capped C8-MCF-3 reverse column (FIG. 9), due to the larger pore sizes and lower surface area of MCF-4.

Figure 10:
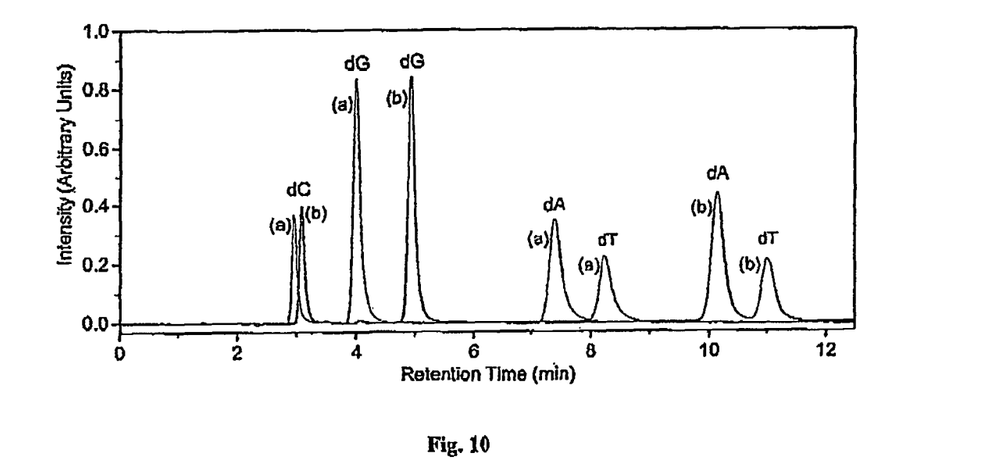
FIG. 10 is a graph illustrating separation of 2'-deoxyguanosine (dG), 2'-deoxyadenosine (dA), 2'-deoxycytidine (dC), and 3'-deoxythymidine (dT) using reverse phase columns packed with (a) mesocellular foam particles according to the present invention (TMS-capped C18-MCF-4) and (b) Atlantis™ dC18, 5 μm, 4.6 mm×150 mm, Waters, as described in the example.

The TMS-capped C18-MCF-4 reverse column successfully separated 2'-deoxyguanosin (dG), 2'-deoxyadenosine (dA), 2'-deoxycytidine (dC), and 3'-deoxythymidine (dT); four non-overlapping, symmetrical peaks were obtained in the chromatograph (FIG. 10). This reverse phase column with ultralarge pore sizes may be particularly useful for the separation of large molecules, such as proteins and biomolecules. The pore sizes of MCF-4 may be further increased by controlling the amounts of TMB and $NH_4F$ added, and the aging time.

The symmetrical chromatography peaks obtained with spherical MCF particles also suggested that a higher efficiency could be achieved with these novel materials in a packed bed reactor.

CONCLUSIONS

Spherical MCF particles with a narrow particle size distribution were prepared by a simple modification of the conventional MCF synthesis method. This approach is more economical and more environment friendly than the original synthesis method. The spherical MCF particles were functionalized with C8 groups or C18 groups, and applied to reverse phase HPLC column separation. The high surface area and large pore volume made it possible to pack a column with a smaller amount of MCF than that required of commercial porous silica. The reverse phase column packed with TMS-capped C8-MCF was successfully used to separate uracil and three aromatic molecules. The reverse column packed with TMS-capped C18-MCF was successfully used to separate four kinds of deoxynucleotides (dA, dC, dG and dT). The pore sizes of spherical MCF particles could be enlarged without changing the particle morphology. Spherical MCF particles with an ultralarge pore size of >15 nm could be used to separate large molecules, such as biomolecules and proteins. They might also be used to immobilize homogeneous complexes or to support transition metal clusters to produce effective heterogeneous catalysts. The mesoporous particles of spherical morphology and uniform particle size could achieve better separation after a reaction, and provide for improved performance in a packed bed reactor.

The invention claimed is:

1. A process for making regular shaped particles of solid foam comprising:
   preparing a first mixture comprising water, an acid, a surfactant and a hydrophobic material, wherein the concentration of the acid is between about 1% and about 10% w/v;
   combining a hydrolysable silicon species with the first mixture to form a second mixture;
   maintaining the second mixture under conditions and for a sufficient time to form regular shaped precursor particles; and
   aging the second mixture at a temperature and for a time effective to produce the regular shaped particles of solid foam.

2. The process of claim 1 wherein maintaining the second mixture is performed under conditions selected from the group consisting of without agitation, without externally applied agitation, and with sufficiently mild agitation as to allow formation of the regular shaped precursor particles.

3. The process of claim 1 wherein the solid foam is selected from the group consisting of silica foam, aluminosilicate foam and doped silica foam.

4. The process of claim 1 wherein the hydrolysable silicon species is selected from the group consisting of a hydrolysable silane, a disiloxane having hydrolysable groups and an oligosiloxane having hydrolysable groups, said hydrolysable silicon species having more than 2 hydrolysable groups per molecule.

5. The process of claim 1 wherein the second mixture is maintained under conditions, at a temperature and for a time sufficient for formation of regular shaped precursor particles between about 2 and about 50 microns in diameter therein.

6. The process of claim 1 wherein the regular shaped particles of solid foam are spherical.

7. The process of claim 1 comprising adding a pore size control agent to the second mixture before aging the second mixture.

8. The process of claim 7 wherein the pore size control agent comprises a fluoride.

9. The process of claim 1 additionally comprising the step of separating the particles of solid foam from a liquid in which they are dispersed.

10. The process of claim 9 additionally comprising forming a mixture of an alkoxide of an additional metal and the regular shaped particles of solid foam in a solvent and heating the mixture for sufficient time to incorporate an oxide of the additional metal into the particles.

11. The process of claim 10 wherein the additional metal is selected from the group consisting of aluminum, tin, lead, titanium and vanadium.

12. The process of claim 9 additionally comprising heating the particles of solid foam for a time and at a temperature sufficient to calcine the particles of solid foam.

13. The process of claim 12 wherein the temperature is greater than about 500° C.

14. The process of claim 1 additionally comprising hydrophobing the particles of solid foam.

15. Regular shaped particles of solid foam, said foam having a pore size such as to be suitable for use as an HPLC packing material, wherein the foam comprises cell-like mesopores connected by windows of a smaller size, and wherein the mean particle diameter of the particles is between about 2 and about 50 microns.

16. The regular shaped particles of solid foam of claim 15 wherein the solid foam is selected from the group consisting of silica foam, aluminosilicate foam and doped silica foam.

17. The regular shaped particles of claim 15 wherein the particles are spherical.

18. The regular shaped particles of claim 15 wherein the foam is mesoporous.

19. The regular shaped particles of claim 15 wherein the pore size is between about 5 and 100 nm.

20. The regular shaped particles of claim 15 wherein the particles are hydrophobic.

21. A packed bed reactor comprising regular shaped particles of solid foam according to claim 15.

22. A process for preparing an HPLC column or a GPC column comprising at least partially filling a housing with regular shaped particles of solid foam, said foam having a pore size such as to be suitable for use as HPLC packing material wherein the foam comprises cell-like mesopores connected by windows of a smaller size and wherein the mean particle diameter of the particles is between about 2 and about 50 microns.

23. An HPLC column or a GPC column comprising regular shaped particles of solid foam, said foam having a pore size such as to be suitable for use as HPLC packing material wherein the foam comprises cell-like mesopores connected by windows of a smaller size and wherein the mean particle diameter of the particles is between about 2 and about 50 microns.

24. A method for separating a mixture of compounds comprising applying the mixture of compounds to an HPLC or GPC column according to claim 23.

25. A solid catalyst comprising regular shaped particles of solid foam and a catalytic material adsorbed or immobilised in said foam, said foam having a pore size such as to be suitable for use as HPLC packing material wherein the foam comprises cell-like mesopores connected by windows of a smaller size and wherein the mean particle diameter of the particles is between about 2 and about 50 microns.

26. A method for catalyzing a reaction of a starting material to a product comprising exposing the starting material to the solid catalyst of claim 25.

27. A process for making regular shaped particles of solid foam comprising:
   preparing a first mixture comprising water, an acid, a surfactant and a hydrophobic material;
   combining a hydrolysable silicon species with the first mixture to form a second mixture;
   maintaining the second mixture under conditions and for a sufficient time to form regular shaped precursor particles;
   aging the second mixture at a temperature and for a time effective to produce the regular shaped particles of solid foam;
   separating the particles of solid foam from a liquid in which they are dispersed;
   forming a mixture of an alkoxide of an additional metal and the regular shaped particles of solid foam in a solvent; and
   heating the mixture for sufficient time to incorporate an oxide of the additional metal into the particles.

* * * * *